United States Patent
Muto et al.

(10) Patent No.: US 12,498,311 B2
(45) Date of Patent: Dec. 16, 2025

(54) DETECTION APPARATUS AND STORAGE APPARATUS

(71) Applicant: Hitachi, Ltd., Tokyo (JP)

(72) Inventors: Ryoma Muto, Tokyo (JP); Masanori Hori, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 179 days.

(21) Appl. No.: 18/463,577

(22) Filed: Sep. 8, 2023

(65) Prior Publication Data

US 2024/0310272 A1 Sep. 19, 2024

(30) Foreign Application Priority Data

Mar. 14, 2023 (JP) ................. 2023-039433

(51) Int. Cl.
*G01N 17/04* (2006.01)

(52) U.S. Cl.
CPC .................. *G01N 17/04* (2013.01)

(58) Field of Classification Search
CPC .... G01N 17/04; G01R 33/00; G01R 33/0035; G01C 17/38; G06F 3/017; G06F 3/0346; G06F 3/012
See application file for complete search history.

(56) References Cited

U.S. PATENT DOCUMENTS

2006/0054072 A1* 3/2006 Sica ................. C23F 13/22
  114/222
2016/0356698 A1* 12/2016 Chou ................. G01N 17/04

FOREIGN PATENT DOCUMENTS

JP          2020134387 A  *  8/2020  ............. G01N 17/04

* cited by examiner

*Primary Examiner* — Lee E Rodak
*Assistant Examiner* — Taqi R Nasir
(74) *Attorney, Agent, or Firm* — Foley & Lardner LLP

(57) ABSTRACT

A detection apparatus attached to a target apparatus, the detection apparatus including: a first resistance element attached to a power supply; a second resistance element connected in series to the first resistance element; and a detection unit that acquires an intermediate voltage between the first resistance element and the second resistance element, in which the second resistance element is exposed to a surrounding atmosphere of the apparatus, and in which the detection unit detects a sign of corrosion of the apparatus caused by the surrounding atmosphere based on a change in the intermediate voltage.

6 Claims, 15 Drawing Sheets

FIG. 3
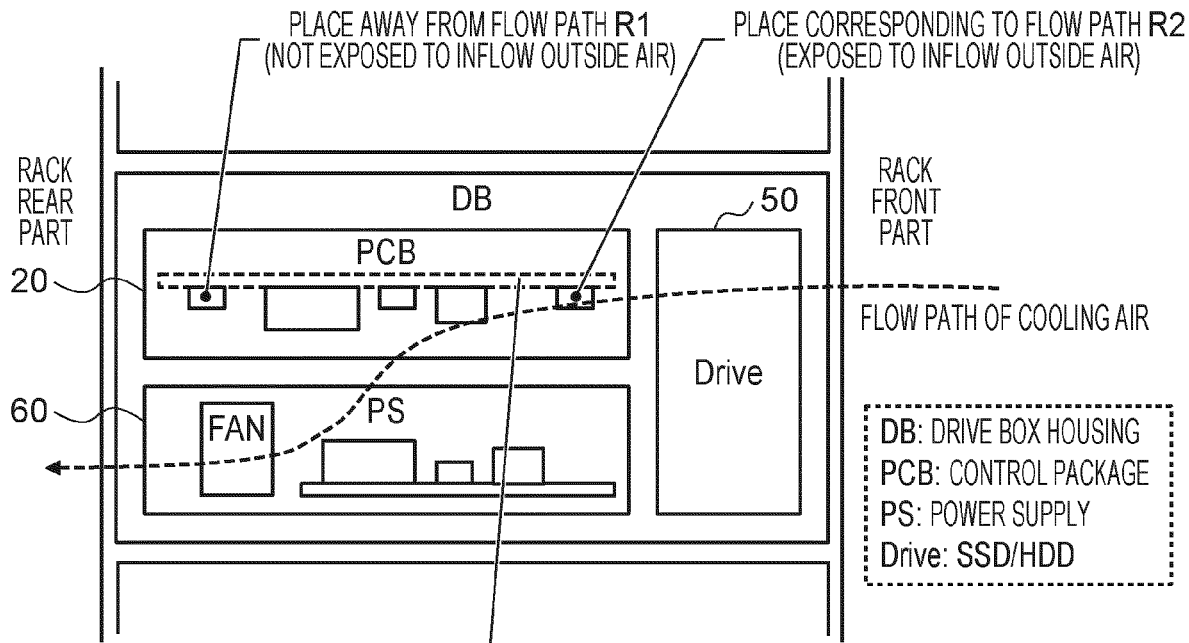
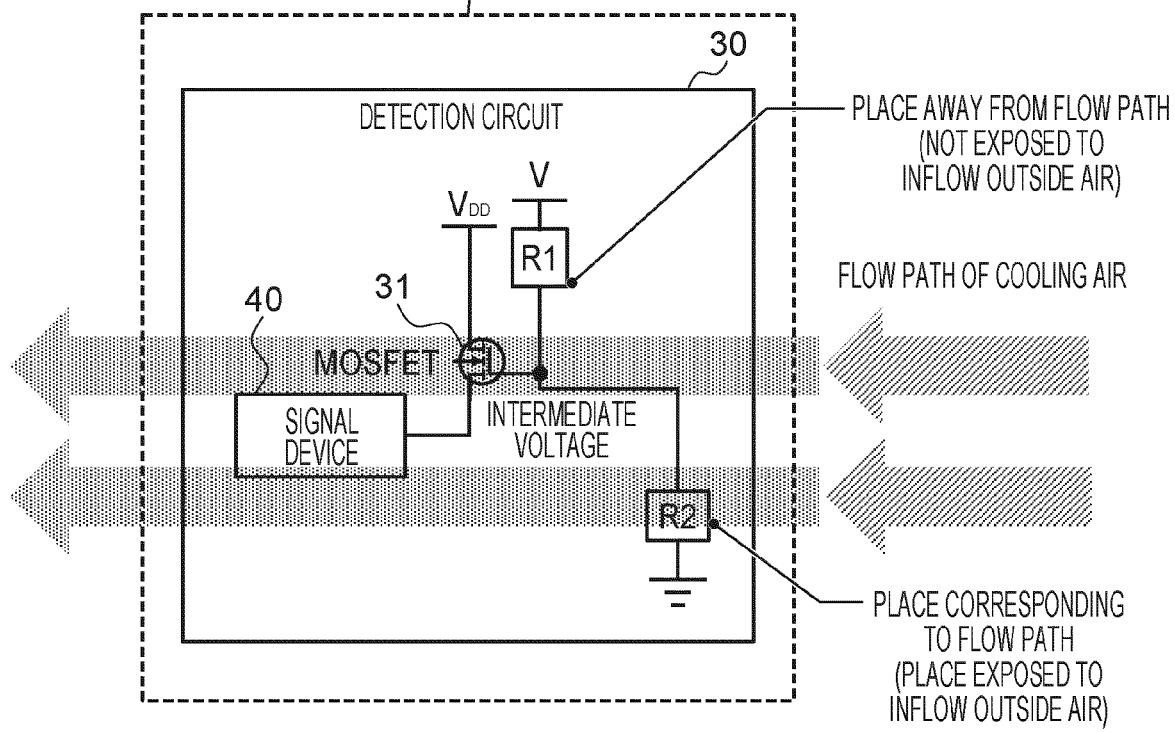

FIG. 12

○ MOSFET OPERATION TABLE

| STATE | NUMERICAL VALUE (V) | SIGNAL DEVICE RESPONSE VALUE |
|---|---|---|
| NORMAL TIME | Vth > V1 | 0 |
| RESISTANCE CORROSION ⇒ RESISTANCE VALUE RISE INTERMEDIATE VOLTAGE RISE | V1 ≥ Vth | 1 |

Vth: MOSFET GATE THRESHOLD VOLTAGE (GATE-SOURCE VOLTAGE REQUIRED TO TURN ON MOSFET, THRESHOLD VOLTAGE)
   MINIMUM V TO MAXIMUM V ARE DETERMINED AS MOSFET SPECIFICATIONS
V1: INTERMEDIATE VOLTAGE

○ CPU MONITORING CYCLE TABLE: POLLING AT SET CYCLE

| ID | SET CYCLE (m) |
|---|---|
| 1 | 1 |
| 2 | 10 |
| 3 | 100 |

○ STATE MANAGEMENT TABLE: USED IN CASE OF ARRANGEMENT AT PLURALITY OF POSITIONS ON SAME PACKAGE (WHICH MAY BE COMPREHENSIVE DETERMINATION OF PLURALITY OF RESULTS)

| ARRANGEMENT PLACE | STATE |
|---|---|
| PCB - A POSITION | OK |
| PCB - B POSITION | OK |
| PCB - C POSITION | OK |

| ARRANGEMENT PLACE | STATE |
|---|---|
| PCB | OK |
| PS | OK |
| BE | OK |

· VARIATIONS OF ARRANGEMENT ON EACH PACKAGE FORMING HOUSING

FIG. 13
○ MOUNTING EXAMPLE
| R1 | 10kΩ |
|---|---|
| R2 | 8.5KΩ |
| V | DC 5V |
| V1 | DC 2.3V |
| VDD | DC 3.3V |
| MOSFET Vth | DC 2.5V |
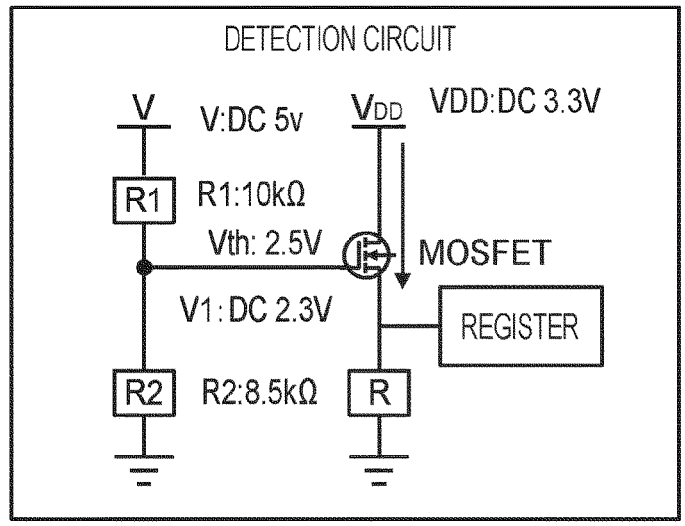
○ CHANGE GRAPH OF R2 RESISTANCE VALUE INCREASE RATE AND V1 INTERMEDIATE VOLTAGE
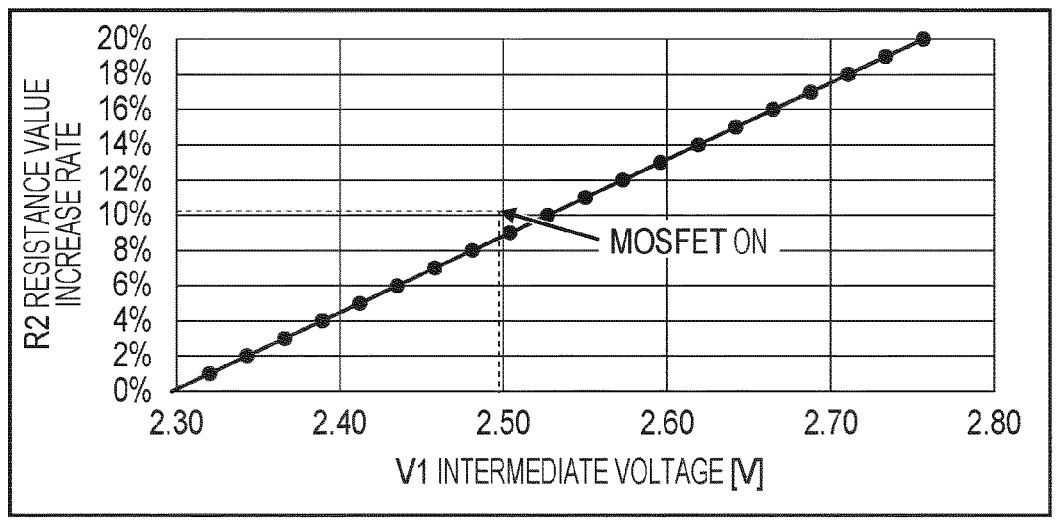
MOSFET IN WHICH SWITCH IS ACTIVATED AT RESISTANCE INCREASE RATE OF 10% (INTERMEDIATE VOLTAGE OF ABOUT 2.5V) BASED ON DESIGN MARGIN IS ASSUMED
○ RESISTANCE VALUE CHANGE GRAPH DUE TO CORROSION WITH LAPSE OF TIME
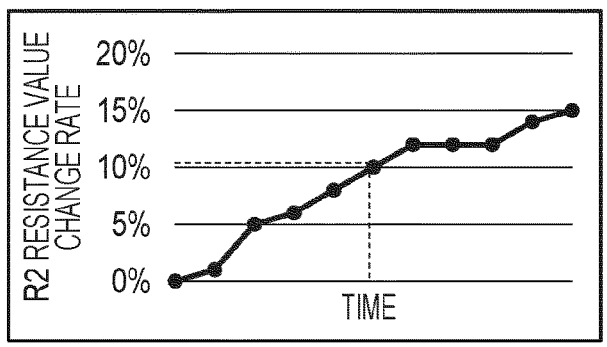

FIG. 14
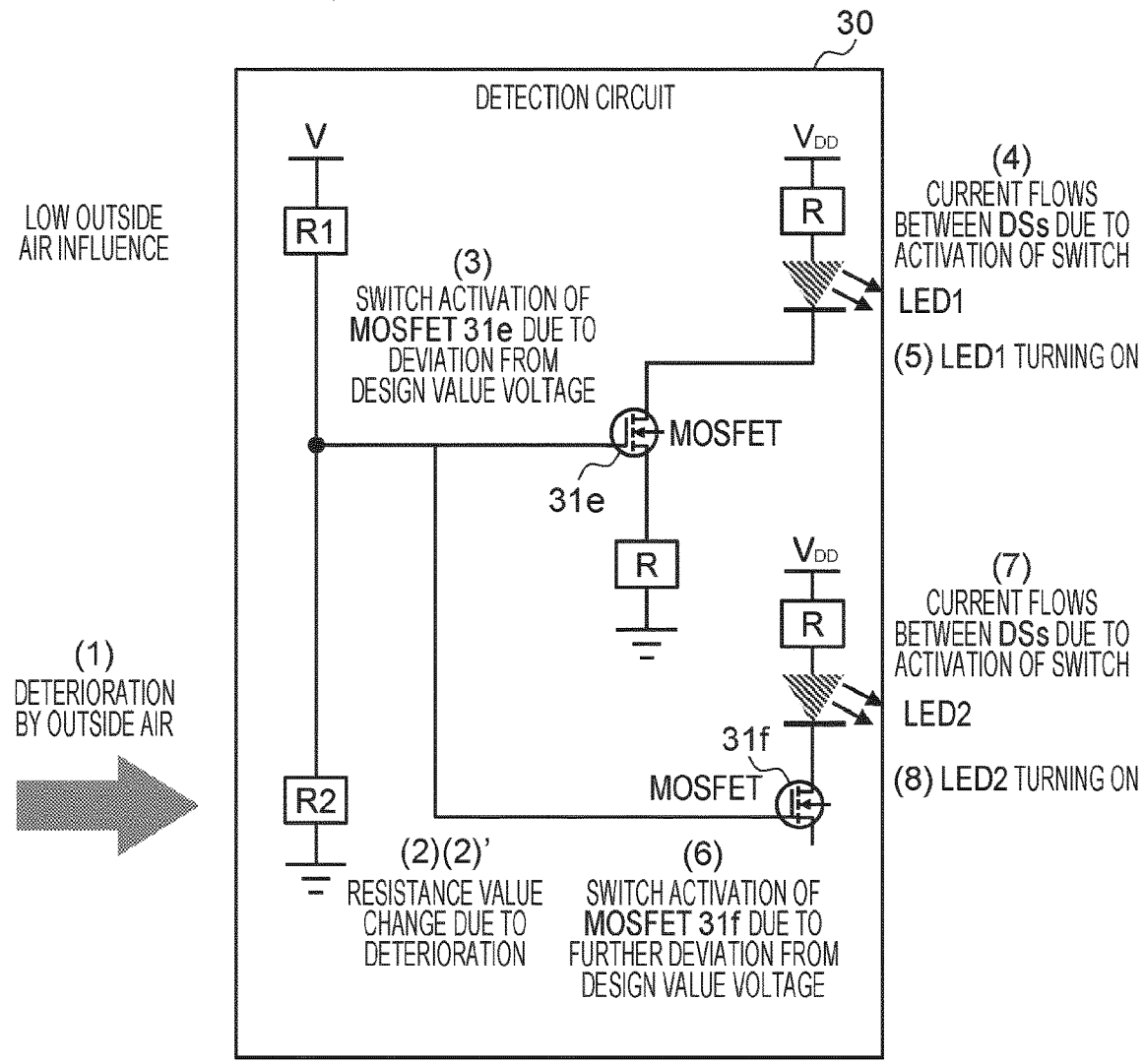
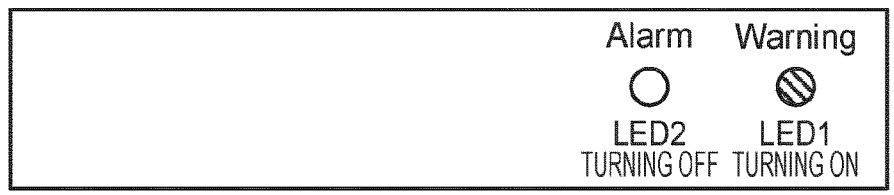

DETECTION APPARATUS AND STORAGE APPARATUS

BACKGROUND OF THE INVENTION

1. Field of the Invention

The present invention relates to a detection apparatus and a storage apparatus.

2. Description of the Related Art

Conventionally, there is a technique described in JP 2020-134387 A in order to predict occurrence of abnormality due to corrosion in a circuit. There is a description of "An abnormality prediction apparatus D is mounted on a printed circuit board 1 used in an environment accompanied by generation of hydrogen sulfide gas, and includes a dummy component 11 set to have a higher temperature than a target electronic component 10 in the printed circuit board 1, and an abnormality detection unit 12 that detects an abnormality of a resistance value of the dummy component 11." in this publication.

SUMMARY OF THE INVENTION

In the conventional technique, focusing on the point that "the corrosion by hydrogen sulfide gas progresses faster as the temperature is higher", the abnormality of the resistance value of the dummy component set to have a higher temperature than the target electronic component is detected. However, the conventional technique does not consider the progress of corrosion due to exposure to the atmosphere. For example, if the use environment of the apparatus is near a factory area or a road with a large traffic volume, the electronic components of the apparatus are exposed to pollutants in the air, corrosion occurs, and failure may occur. In particular, this problem becomes serious in a storage apparatus or the like adopting an air cooling system in which outside air is taken in by a fan. Furthermore, since the storage apparatus is required to operate at all times without stopping, it is required to detect a failure due to corrosion or the like as early as possible and take measures.

Therefore, an object of the present invention is to detect a sign of corrosion due to exposure to the atmosphere.

In order to achieve the above object, one of representative detection apparatuses of the present invention is a detection apparatus attached to a target apparatus, the detection apparatus including: a first resistance element attached to a power supply; a second resistance element connected in series to the first resistance element; and a detection unit that acquires an intermediate voltage between the first resistance element and the second resistance element, in which the second resistance element is exposed to a surrounding atmosphere of the apparatus, and in which the detection unit detects a sign of corrosion of the apparatus caused by the surrounding atmosphere based on a change in the intermediate voltage.

Further, one of representative storage apparatuses of the present invention includes: a memory device; a control unit that reads and writes data from and to the memory device; an air blowing unit that cools the memory device and/or the control unit by taking in a surrounding atmosphere; and a detection apparatus attached to the control unit, in which the detection apparatus includes: a first resistance element attached to a power supply; a second resistance element connected in series to the first resistance element; and a detection unit that acquires an intermediate voltage between the first resistance element and the second resistance element, in which the second resistance element is exposed to the surrounding atmosphere, and in which the detection unit detects a sign of corrosion caused by the surrounding atmosphere based on a change in the intermediate voltage.

According to the present invention, it is possible to detect a sign of corrosion due to exposure to the atmosphere. Problems, configurations, and effects other than those described above will be clarified by the following description of embodiment.

BRIEF DESCRIPTION OF THE DRAWINGS

FIG. 3 is an explanatory diagram of a circuit arrangement;

FIG. 12 is an explanatory diagram of the management table;

FIG. 13 is an explanatory diagram of mounting and resistance change;

FIG. 14 is a configuration diagram in a case where notification is performed by an LED.

DESCRIPTION OF THE PREFERRED EMBODIMENTS

Hereinafter, embodiments will be described with reference to the drawings.

First Embodiment

Figure 1:
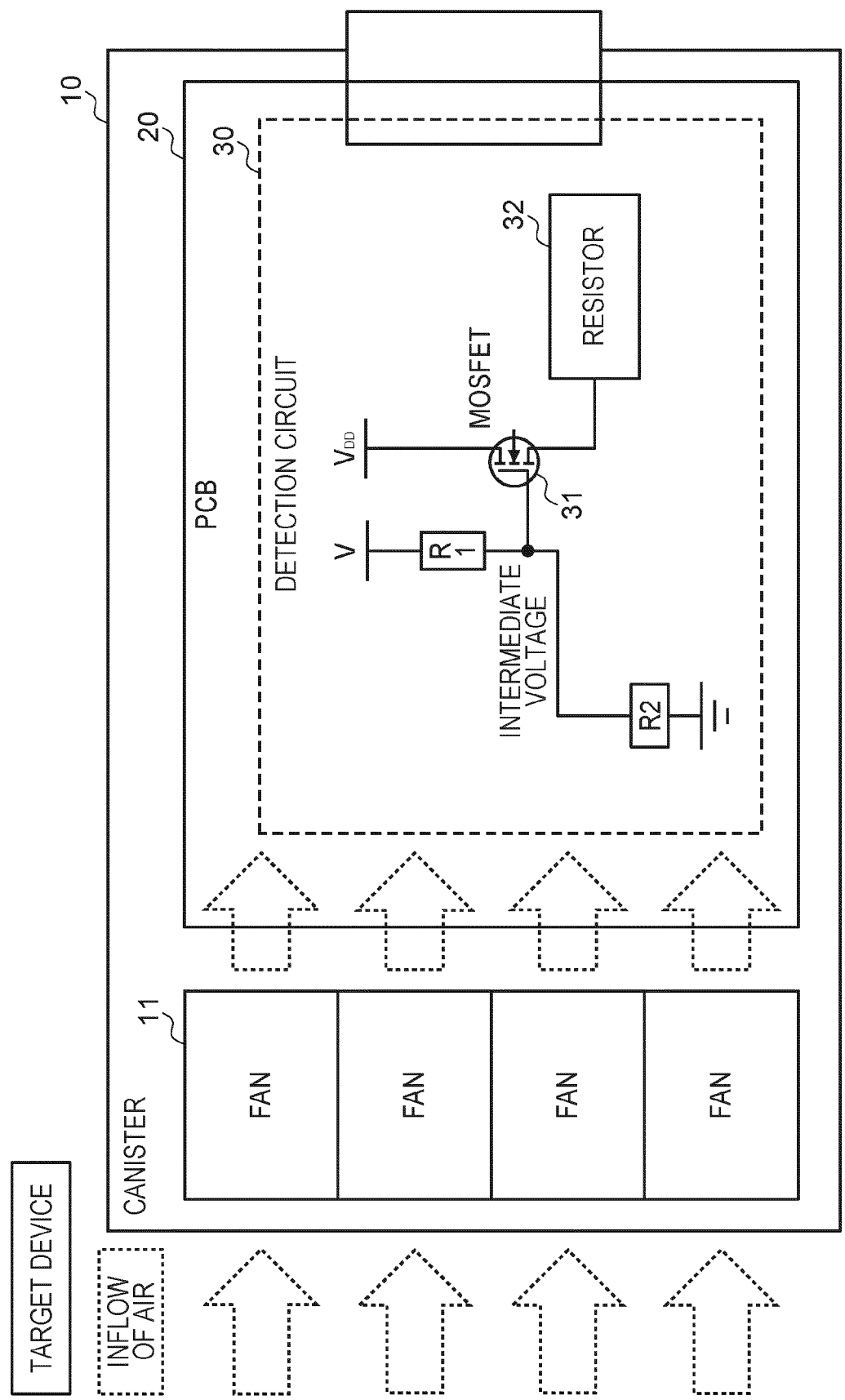
FIG. 1 is an explanatory diagram of a target device and a detection circuit.

FIG. 1 is an explanatory diagram of a target device and a detection circuit. The target device in FIG. 1 is a storage apparatus 10. The storage apparatus 10 includes a fan 11, a printed circuit board (PCB) 20, and a detection circuit 30 inside a container (canister).

The fan 11 is an air blowing unit that takes in the surrounding atmosphere and cools the storage apparatus 10. The PCB 20 is a package in which various electronic components are mounted and which operates as a control unit of the storage apparatus 10.

The detection circuit 30 of FIG. 1 is attached to the PCB 20, and includes a resistance element R1 as a first resistance element, a resistance element R2 as a second resistance element, a metal-oxide-semiconductor field-effect transistor (MOSFET) 31, and a register 32.

The resistance element R1 is attached to a power supply, and the resistance element R2 is connected in series to the resistance element R1. The MOSFET 31 acquires an intermediate voltage between the resistance element R1 and the resistance element R2 as a gate voltage. The MOSFET 31 operates and conducts when the gate voltage becomes equal to or higher than a specified voltage, and updates the value of the register 32.

Figure 2:
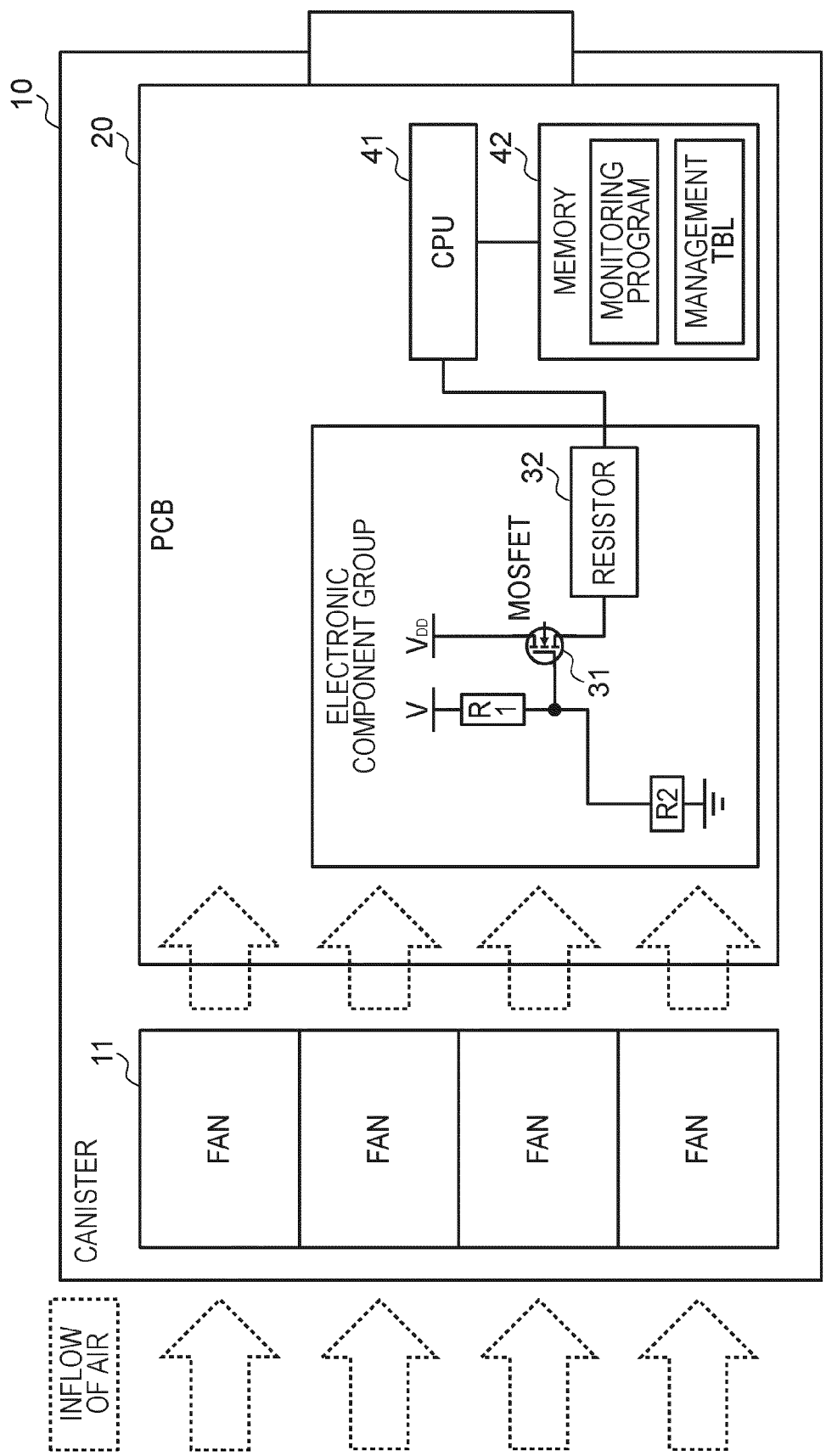
FIG. 2 is an explanatory diagram of a program and a management table.

FIG. 2 is an explanatory diagram of a program and a management table. In FIG. 2, a central processing unit (CPU) 41 is connected to the register 32. A memory 42 is connected to the CPU 41. The memory 42 stores a monitoring program and a management table. The CPU 41 reads and executes the monitoring program in the memory 42 to acquire the value of the register 32 and detect a sign of corrosion.

FIG. 3 is an explanatory diagram of a circuit arrangement. As illustrated in FIG. 3, a drive box housing of the storage apparatus 10 includes a drive 50 (for example, a solid state drive or a hard disk drive) as a memory device, a PCB 20, and a power supply unit (PS) 60. The fan 11 is provided in the power supply unit 60. When the fan 11 is operated, cooling air flows in a flow path passing through the drive 50, the PCB 20, and the power supply unit 60 to cool the apparatus. There is locality in how the cooling air comes into contact. In terms of cooling the apparatus, the locality of the cooling air is not a problem and the temperature can be lowered to some extent overall. On the other hand, the locality greatly affects the influence of the cooling air itself. For example, if the outside air to be the cooling air is contaminated, the electronic component in the place corresponding to the flow path is exposed to the flowing outside air, so that the corrosion progresses quickly.

Therefore, in the detection circuit 30, the resistance element R1 is arranged at a place away from the flow path (a place not exposed to the inflow outside air), and the resistance element R2 is arranged at a place corresponding to the flow path (a place exposed to the inflow outside air). In this way, if the resistance element R2 is exposed to the surrounding atmosphere and the resistance element R1 is not exposed to the surrounding atmosphere as compared with the resistance element R2, corrosion of the resistance element R2 progresses faster than that of the resistance element R1. As a result, the intermediate voltage between the resistance element R2 and the resistance element R1 changes. When the MOSFET 31 is operated by the change in the intermediate voltage, the signal device 40 can detect a sign of corrosion. Note that the signal device 40 is a device that appropriately includes elements such as the register 32 and the CPU 41 as necessary, processes a signal, and outputs a result of corrosion detection.

A chemical agent that promotes corrosion may be applied to the resistance element R2. If a chemical agent that promotes corrosion is applied, the progress of corrosion of the resistance element R2 is accelerated, and the sign can be detected earlier.

Figure 4:
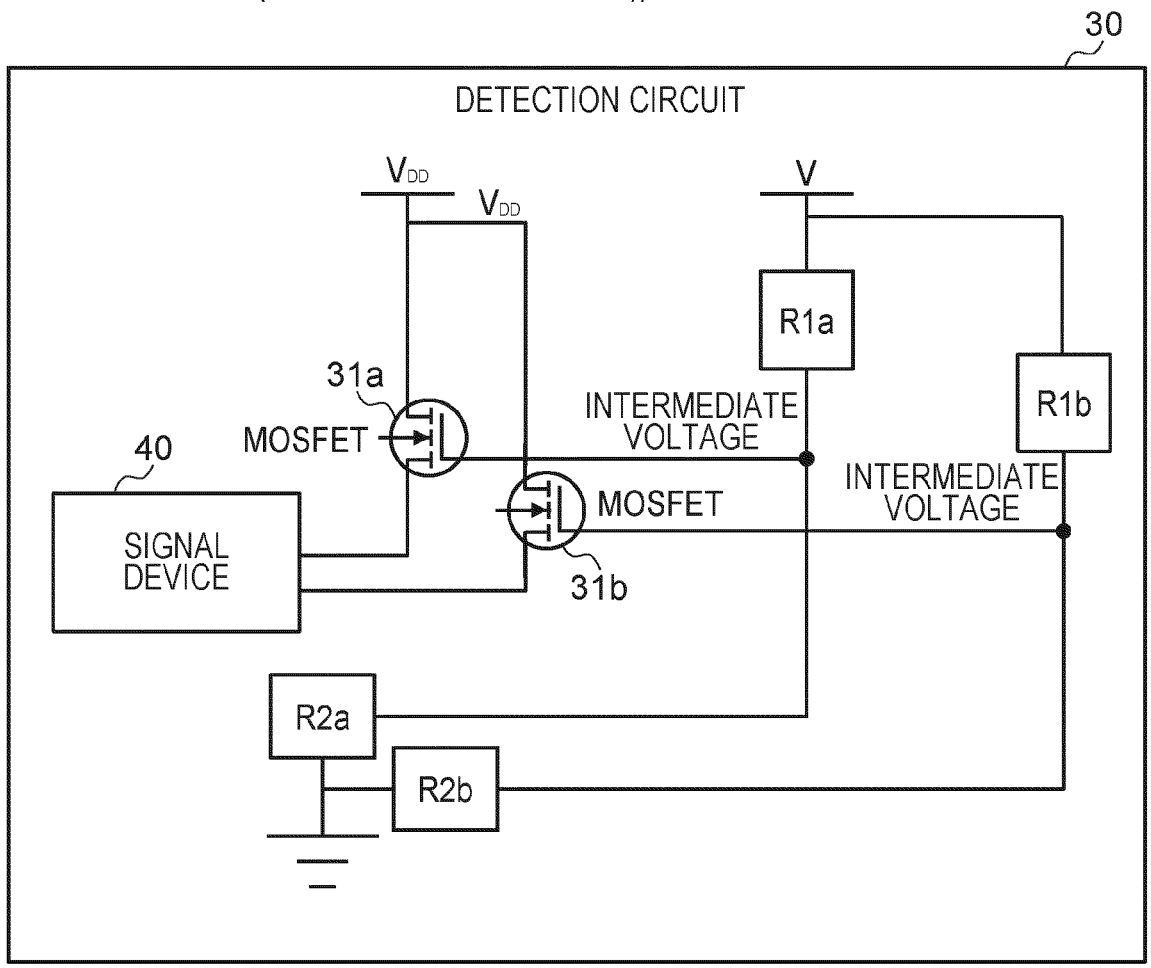
FIG. 4 is an explanatory diagram in a case where a plurality of detection circuits are mounted.

In addition, detection circuits may be mounted at a plurality of places. FIG. 4 is an explanatory diagram in a case where a plurality of detection circuits are mounted. In FIG. 4, a resistance element R1a and a resistance element R2a are connected in series, and an intermediate voltage is set as a gate voltage of a MOSFET 31a. In addition, a resistance element R1b and a resistance element R2b are connected in series, and an intermediate voltage is set as a gate voltage of a MOSFET 31b. The resistance element R2a and the resistance element R2b are arranged at different positions on the flow path. By arranging as in k, a sign of corrosion can be detected from fluctuations of intermediate voltages at a plurality of places.

Next, a state-driven configuration and an event-driven configuration will be described.

Figure 5:
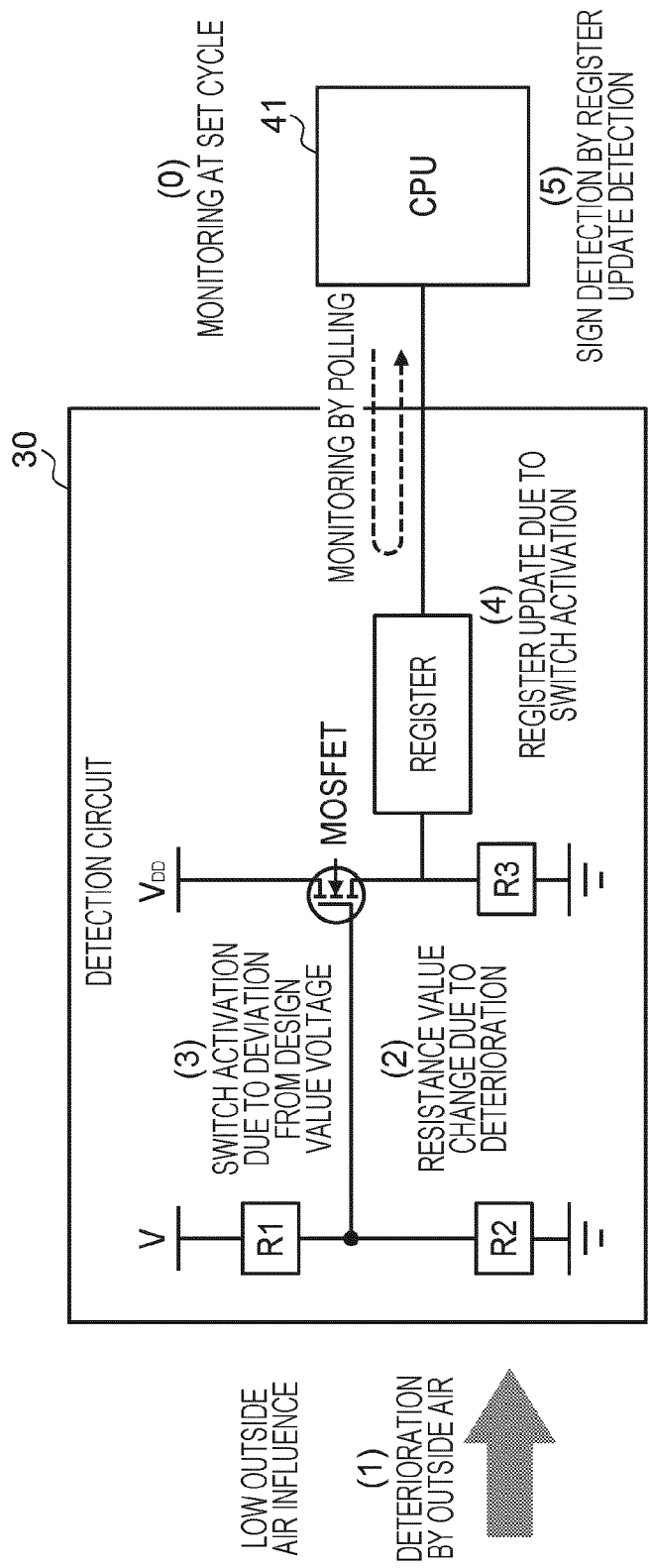
FIG. 5 is an explanatory diagram of a state-driven configuration.

FIG. 5 is an explanatory diagram of the state-driven configuration. In the state driven, a sign of corrosion is detected by state monitoring.

Specifically, the CPU 41 performs polling at a preset cycle and monitors the value of the register (0). When the resistance element R2 deteriorates under the influence of the outside air (1), the resistance value of the resistance element R2 changes (2). When the intermediate voltage deviates from the design value voltage due to the change in the resistance value of the resistance element R2, the switch of the MOSFET is activated (3). When this switch is activated, the value of the register is updated (4). When detecting the register update by polling, the CPU 41 detects a sign of corrosion (5).

Figure 6:
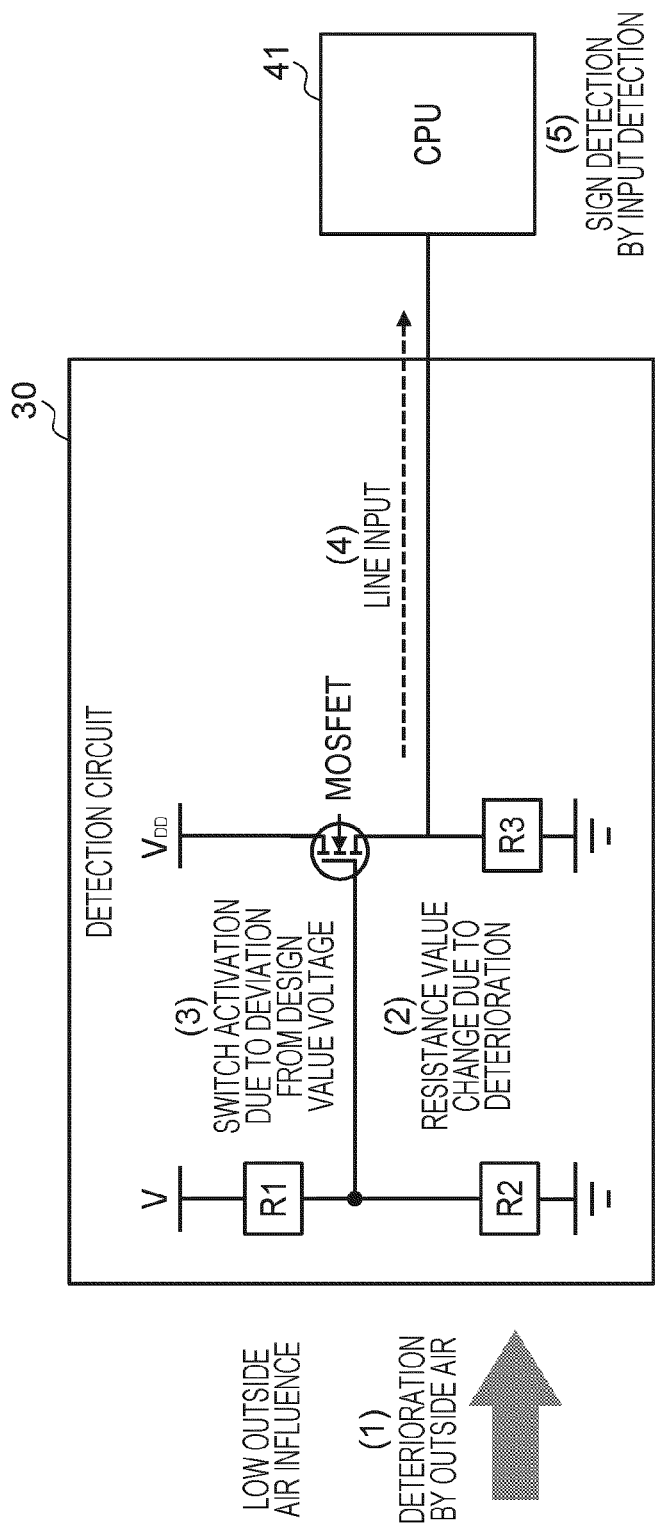
FIG. 6 is an explanatory diagram of an event-driven configuration.

FIG. 6 is an explanatory diagram of the event-driven configuration. In the event-driven, activation of the MOSFET due to the potential difference is input as an event to the CPU 41 as a line, and a sign of corrosion is detected.

Specifically, when the resistance element R2 deteriorates under the influence of the outside air (1), the resistance value of the resistance element R2 changes (2). When the intermediate voltage deviates from the design value voltage due to the change in the resistance value of the resistance element R2, the switch of the MOSFET is activated (3). When this switch is activated, a line is input to the CPU 41 (4). When detecting the line input as an event, the CPU 41 detects a sign of corrosion (5).

Figure 7:
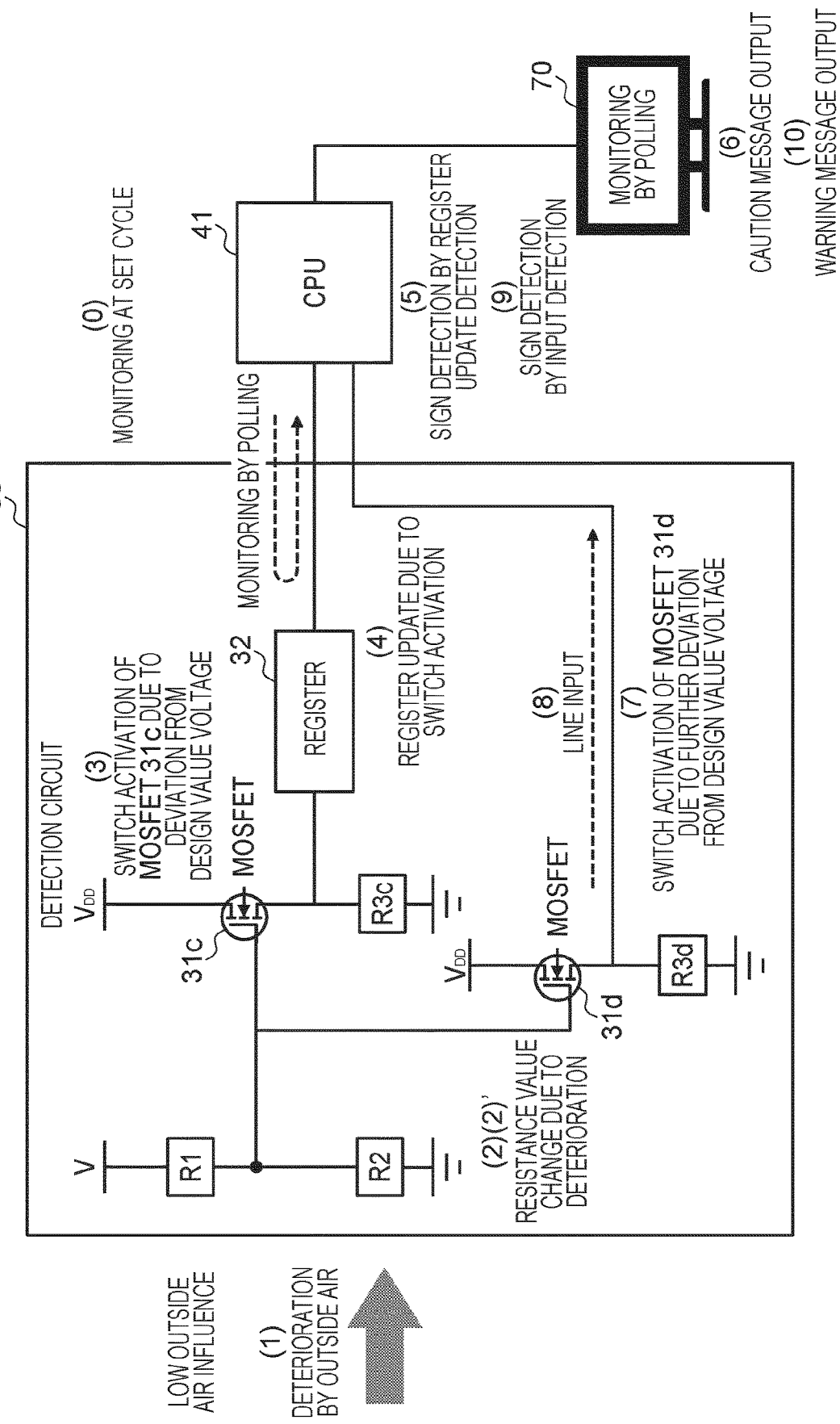
FIG. 7 is an explanatory diagram of a hybrid driving configuration.

FIG. 7 is an explanatory diagram of the hybrid driving configuration. In the hybrid driven configuration, a plurality of MOSFETs having different operating voltages are mounted to provide a level for corrosion detection.

In the hybrid configuration of FIG. 7, first, the detection circuit 30 includes a MOSFET 31c and a MOSFET 32d. The MOSFET 31c and the MOSFET 32d acquire the same intermediate voltage as a gate voltage, but have different operating voltages. The operating voltage of the MOSFET 31c is lower than the operating voltage of the MOSFET 31d. Therefore, when the resistance element R2 deteriorates and the intermediate voltage gradually increases, the MOSFET 31c operates first, and then the MOSFET 31d operates. When the MOSFET 31c operates, the register 32 is updated. When the MOSFET 31d operates, a line is input to the CPU 41. Further, the CPU 41 is connected to the monitor 70, and can output a call attention message or a warning message to a monitor 70.

The operation of FIG. 7 will be sequentially described. The CPU 41 performs polling at a preset cycle and monitors the value of the register 32 (0). When the resistance element R2 deteriorates under the influence of the outside air (1), the resistance value of the resistance element R2 changes (2) (2)'. When the intermediate voltage deviates from the design value voltage due to the change in the resistance value of the resistance element R2, the switch of the MOSFET 31c is activated (3). When this switch is activated, the value of the register 32 is updated (4). When detecting the register update by polling, the CPU 41 detects a sign of corrosion (5) and outputs a caution message to the monitor 70 (6).

Thereafter, when the intermediate voltage further deviates from the design value voltage, the switch of the MOSFET 32d is activated (7). When this switch is activated, a line is input to the CPU 41 (8). When detecting the line input as an event, the CPU 41 detects a sign of corrosion (9) and outputs a warning message to the monitor 70 (10).

Figure 8:
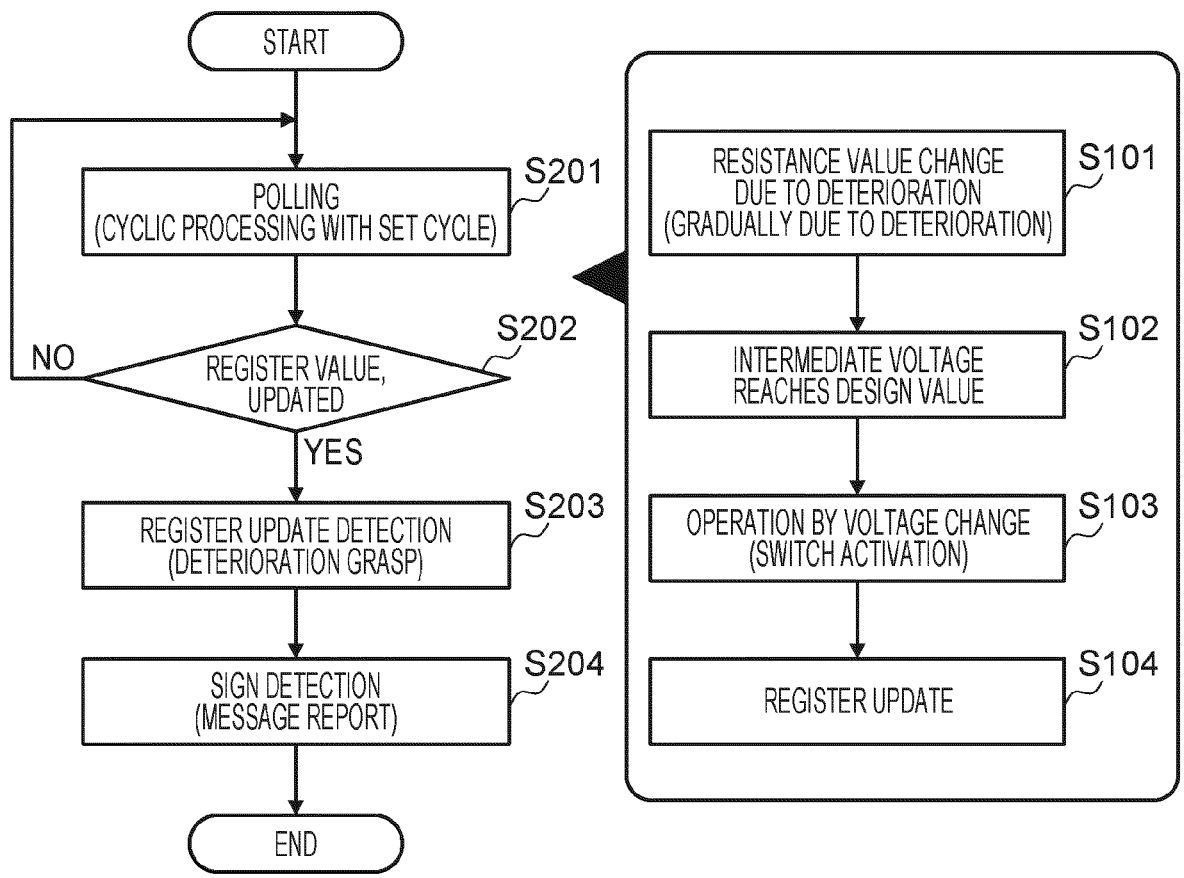
FIG. 8 is an explanatory diagram of state-driven processing (part 1)
Figure 9:
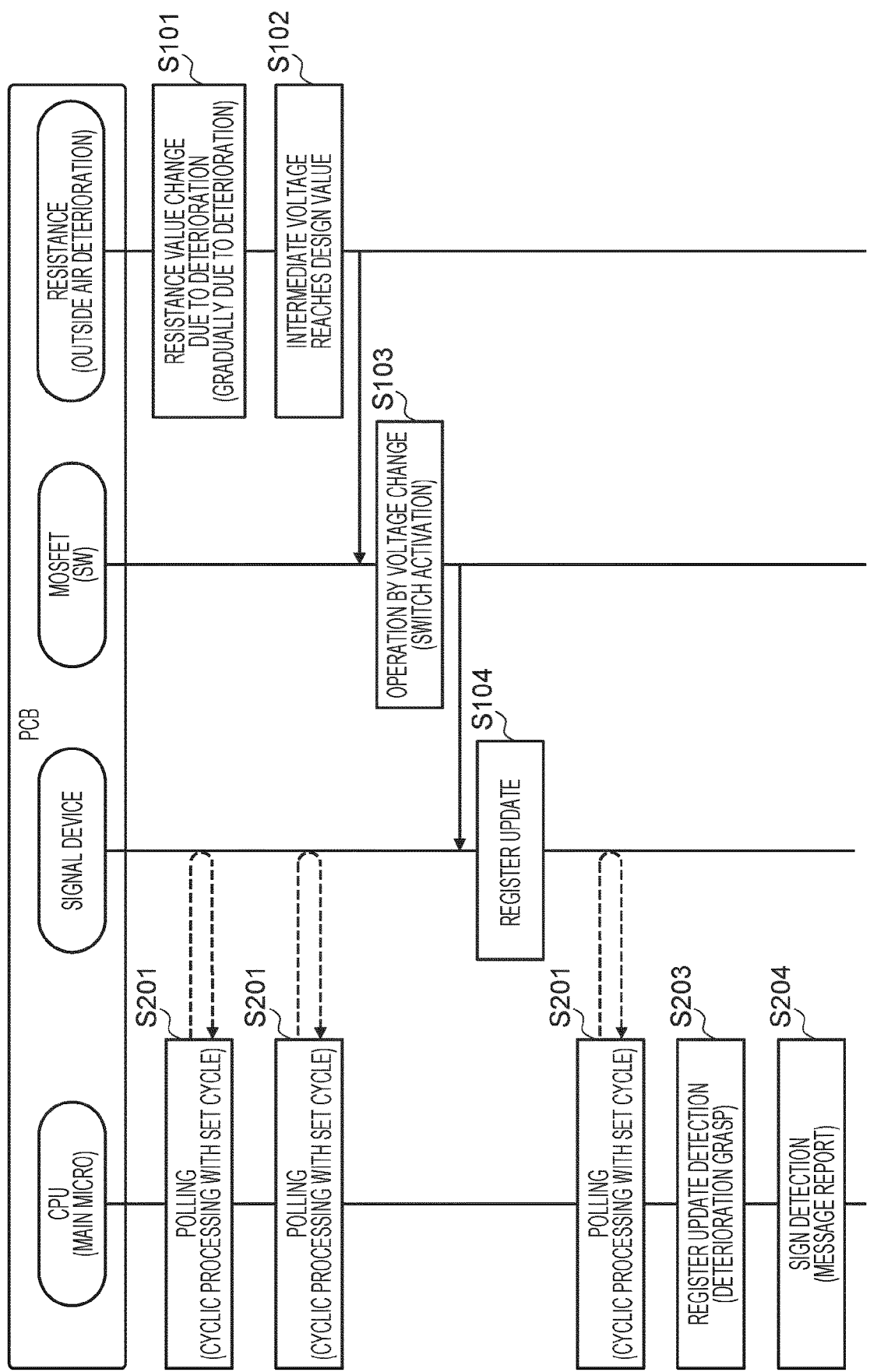
FIG. 9 is an explanatory diagram of state-driven processing (part 2)

FIGS. 8 and 9 are explanatory diagrams of state-driven processing.

The resistance value of the resistance element R2 gradually changes due to deterioration (step S101). Therefore, in any case, the intermediate voltage reaches the design value (step S102). The switch of the MOSFET 31 is activated by the change in the intermediate voltage (step S103), and the register 32 is updated (step S104).

The CPU 41 monitors the value of the register 32 by polling (cyclic processing with a set cycle) (step S201). If the register 32 has not been updated (step S202; No), the polling is repeated. If the register 32 has been updated (step S202; Yes), the CPU 41 detects the update of the register 32 (step S203). The detection of the update of the register 32 means that the CPU 41 has grasped the deterioration of the resistance element R2. Thereafter, the CPU 41 outputs a message indicating that a sign of corrosion has been detected (step S204), and ends the processing.

Figure 10:
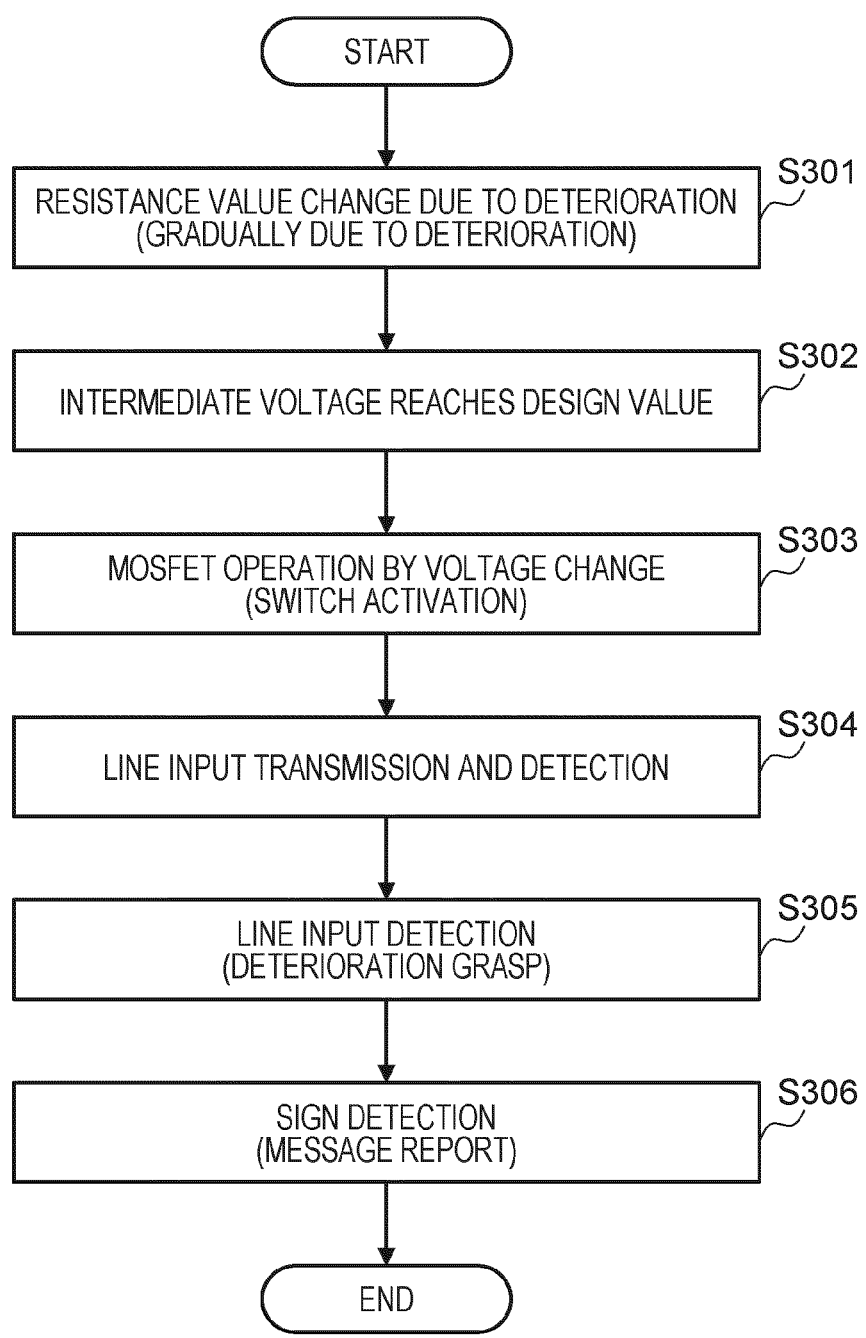
FIG. 10 is an explanatory diagram of event-driven processing (part 1)
Figure 11:
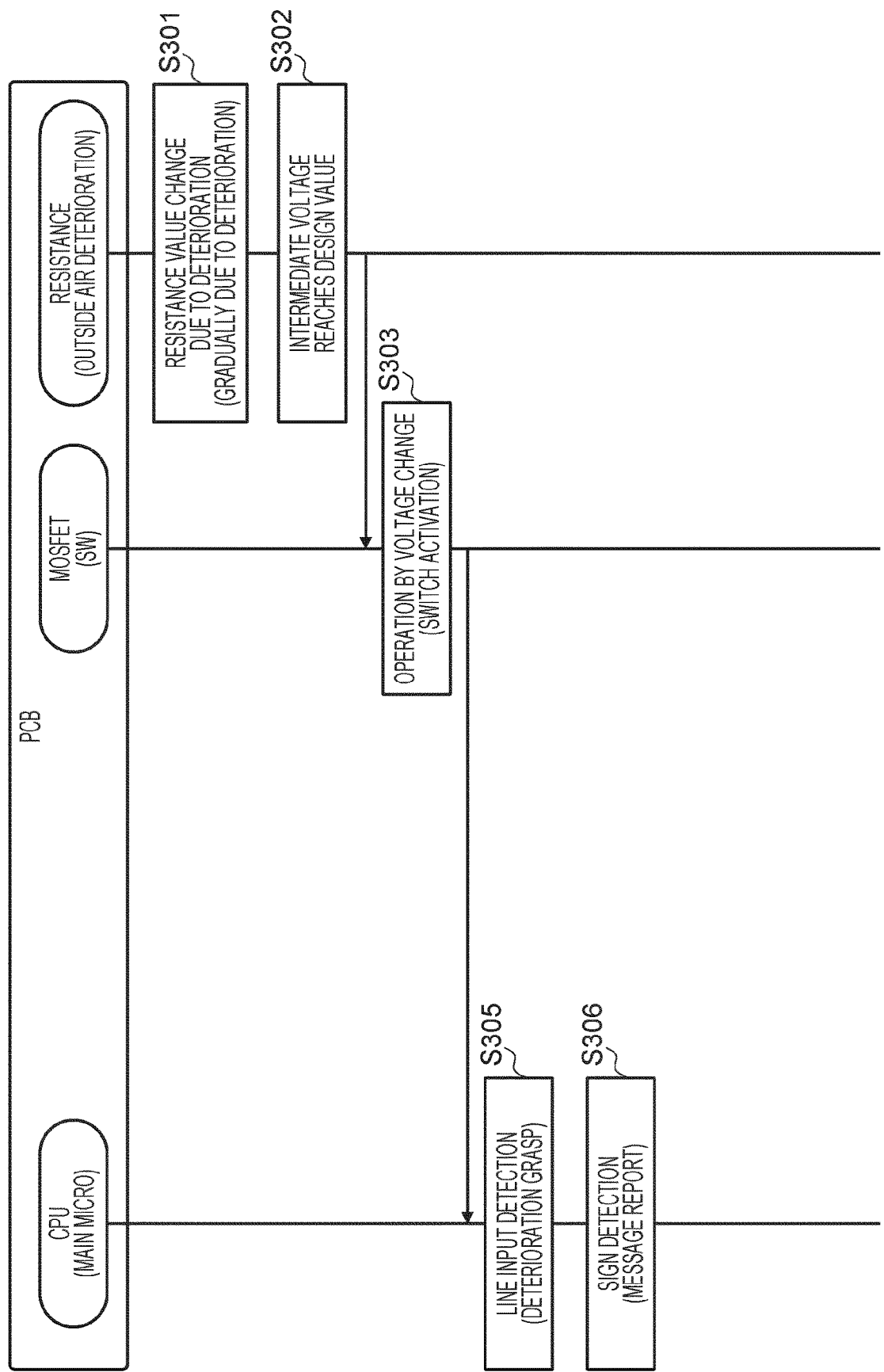
FIG. 11 is an explanatory diagram of event-driven processing (part 2)

FIGS. 10 and 11 are explanatory diagrams of event-driven processing.

The resistance value of the resistance element R2 gradually changes due to deterioration (step S301). Therefore, in any case, the intermediate voltage reaches the design value (step S302). The switch of the MOSFET 31 is activated by a change in the intermediate voltage (step S303), and inputs a line to the CPU 41.

The CPU 41 receives the line input (step S304). The detection of the line input (step S305) means that the CPU 41 has grasped the deterioration of the resistance element R2. Thereafter, the CPU 41 outputs a message indicating that a sign of corrosion has been detected (step S306), and ends the processing.

FIG. 12 is an explanatory diagram of the management table. The management table includes a MOSFET operation table, a CPU monitoring cycle table, a state management table, and the like. In the MOSFET operation table, a state, a numerical value of the intermediate voltage value V1 and the gate threshold voltage Vth, and a signal device response value are associated with each other. The normal state is Vth>V1, and the signal device response value is "0". In a state in which the resistance value increases due to the corrosion of the resistance and the intermediate voltage increases, V1≥Vth, and the signal device response value is "1".

The CPU monitoring cycle table sets a polling cycle. For example, an ID is associated with a cycle of 1 ms, 10 ms, 100 ms, or the like, and the cycle can be set by specifying the ID.

The state management table is particularly used in a case of arrangement at a plurality of places on the same package. In addition, a plurality of results may be comprehensively determined. In FIG. 12, a state (OK or NG) is illustrated for each arrangement place.

FIG. 13 is an explanatory diagram of mounting and resistance change.

In FIG. 13, the resistance element R1 is "10 kΩ", the resistance element R2 is "8.5 kΩ", the power supply voltage V is "DC 5 V", the intermediate voltage V1 is "DC 5 V", the drain voltage VDD of the MOSFET is "DC 3.3 V", and the operating voltage of the MOSFET is "DC 2.5 V".

In this configuration, the intermediate voltage V1 increases as the resistance value of the resistance element R2 increases. Then, when the resistance value of the resistance element R2 increases by 10%, the intermediate voltage V1 reaches the operating voltage 2.5 V of the MOSFET.

The rate of change in the resistance value of the resistance element R2 increased with the lapse of time.

FIG. 14 is a configuration diagram in a case where notification is performed by an LED. In FIG. 14, a plurality of MOSFETs having different operating voltages are mounted, a "level" is provided for corrosion detection, and an LED corresponding to the level is turned on.

In the configuration of FIG. 14, first, the detection circuit 30 includes a MOSFET 31e and a MOSFET 32f. The MOSFET 31c and the MOSFET 32d acquire the same intermediate voltage as a gate voltage, but have different operating voltages. The operating voltage of the MOSFET 31e is lower than the operating voltage of the MOSFET 31f. Therefore, when the resistance element R2 deteriorates and the intermediate voltage gradually increases, the MOSFET 31e operates first, and then the MOSFET 31f operates. When the MOSFET 31e is activated, an LED 1 is turned on. When the MOSFET 31f is activated, the LED 1 is turned on.

The operation of FIG. 14 will be sequentially described. When the resistance element R2 deteriorates under the influence of the outside air (1), the resistance value of the resistance element R2 changes (2)(2)'. When the intermediate voltage deviates from the design value voltage due to the change in the resistance value of the resistance element R2, the switch of the MOSFET 31e is activated (3). When this switch is activated, a current flow between the drain and the source of the LED 1 (4), and the LED 1 is turned on (5).

Thereafter, when the intermediate voltage further deviates from the design value voltage, the switch of the MOSFET 32f is activated (6). When this switch is activated, a current flow between the drain and the source of the LED 2 (7), and the LED 2 is turned on (8).

The LED 1 and the LED 2 are provided so as to be visible from the outside of the housing. By making the lighting of the LED 1 correspond to "Warning" and the lighting of the LED 2 correspond to "Alarm", it is possible to perform notification according to the level according to the progress of corrosion.

Figure 15:
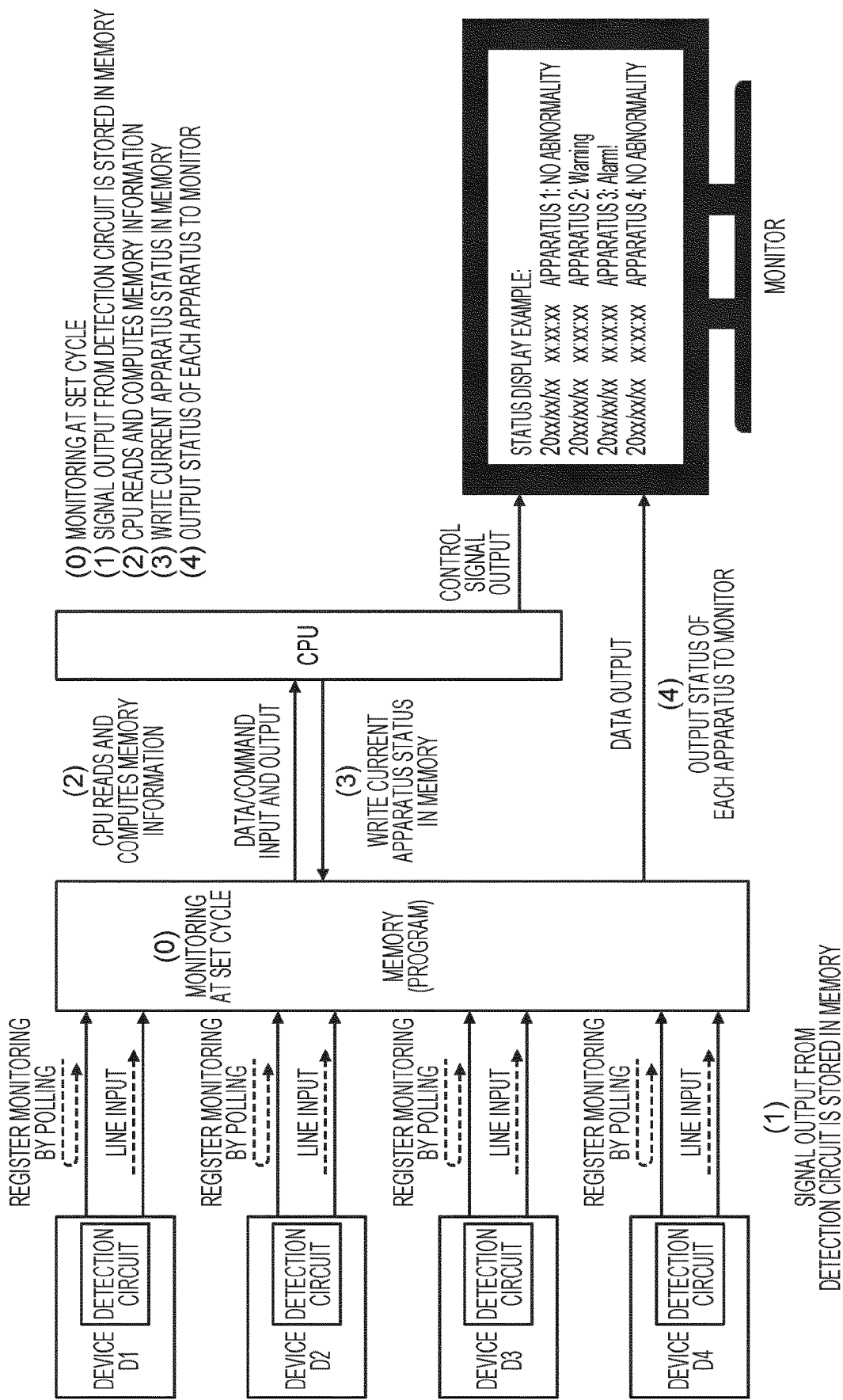
FIG. 15 is an explanatory diagram of display for a plurality of apparatuses.

FIG. 15 is an explanatory diagram of display for a plurality of apparatuses. Apparatuses D1 to D4 have the hybrid driven configuration illustrated in FIG. 7. In this configuration, each apparatus is monitored by polling at a set cycle (0). Signals output from detection circuits of the apparatuses D1 to D4 are stored in the memory (1). The CPU reads and computes the information in the memory (2), and writes the current apparatus status in the memory (3). Then, the status of each apparatus is output to the monitor. As a result, for each apparatus, "No abnormality", "Warning", and "Alarm" can be notified in an identifiable manner.

As described above, the detection circuit 30 disclosed in the embodiment is a detection apparatus attached to a target apparatus, the detection apparatus including: a first resistance element (R1) attached to a power supply; a second resistance element (R2) connected in series to the first resistance element; and a signal device 40 as a detection unit that acquires an intermediate voltage between the first resistance element and the second resistance element, in which the second resistance element is exposed to a surrounding atmosphere of the apparatus, and in which the detection unit detects a sign of corrosion of the apparatus caused by the surrounding atmosphere based on a change in the intermediate voltage.

With such a configuration and operation, the detection apparatus can detect a sign of corrosion due to exposure to the atmosphere. If the second resistance element is equivalent to an element used in the target apparatus, a sign of corrosion can be detected with higher accuracy.

In addition, the detection unit includes a metal-oxide-semiconductor field-effect transistor that conducts at a specified voltage, and performs an output indicating that there is a sign of corrosion in response to the conduction.

As described above, since the configuration is simple, a sign of corrosion can be detected at low cost.

In addition, a chemical agent that promotes corrosion may be applied to the second resistance element.

By promoting a sign of corrosion, it is possible to perform detection at an earlier stage.

In addition, the detection apparatus may include a plurality of the detection units, and each of the plurality of detection units may operate at a different intermediate voltage value, and perform an operation according to an urgency corresponding to the operating detection unit.

Furthermore, the detection apparatus may further include an output unit that outputs a warning in a different mode according to the operating detection unit.

In such a configuration, stepwise notification is possible.

Further, the present invention may be carried out as a storage apparatus including: a memory device (50); a control unit (20) that reads and writes data from and to the memory device; an air blowing unit (11) that cools the memory device and/or the control unit by taking in a surrounding atmosphere; and a detection apparatus (30) attached to the control unit, in which the detection apparatus includes: a first resistance element (R1) attached to a power supply; a second resistance element (R2) connected in series to the first resistance element; and a detection unit that acquires an intermediate voltage between the first resistance element and the second resistance element, in which the second resistance element is exposed to the surrounding atmosphere, and in which the detection unit detects a sign of corrosion caused by the surrounding atmosphere based on a change in the intermediate voltage.

Note that the present invention is not limited to the above embodiment, and includes various modifications. For example, the embodiment described above has been described in detail for easy understanding of the present invention, and is not necessarily limited to that having all the configurations described. In addition, the configuration can be replaced or added as well as the deletion of the configuration.

What is claimed is:

1. A detection apparatus attached to a target apparatus, the detection apparatus comprising:
   a first resistance element attached to a power supply;
   a second resistance element connected in series to the first resistance element;
   a fan that takes in a surrounding atmosphere of the detection apparatus and directs a flow path of air from the surrounding atmosphere through the detection apparatus; and
   a detection unit that acquires an intermediate voltage between the first resistance element and the second resistance element, wherein
   the second resistance element is exposed to the flow path of the air directed by the fan,
   the first resistance element is not exposed to the flow path of the air directed by the fan, and
   the detection unit detects a sign of corrosion of the apparatus caused by the surrounding atmosphere based on a change in the intermediate voltage.

2. The detection apparatus according to claim 1, wherein the detection unit includes a metal-oxide-semiconductor field-effect transistor that conducts at a specified voltage, and performs an output indicating that there is a sign of corrosion in response to the conduction.

3. The detection apparatus according to claim 1, wherein a chemical agent that promotes corrosion is applied to the second resistance element.

4. The detection apparatus according to claim 1, comprising a plurality of the detection units, wherein each of the plurality of detection units operates at a different intermediate voltage value, and performs an operation according to an urgency corresponding to the operating detection unit.

5. The detection apparatus according to claim 4, further comprising an output unit that outputs a warning in a different mode according to the operating detection unit.

6. A storage apparatus comprising:
   a memory device;
   a control unit that reads and writes data from and to the memory device;
   an air blowing unit that cools the memory device and/or the control unit by taking in a surrounding atmosphere and directing a flow path of air from the surrounding atmosphere through the storage apparatus; and
   a detection apparatus attached to the control unit, wherein the detection apparatus includes:
   a first resistance element attached to a power supply;
   a second resistance element connected in series to the first resistance element; and
   a detection unit that acquires an intermediate voltage between the first resistance element and the second resistance element, wherein
   the second resistance element is exposed to the flow path of the air directed by the air blowing unit,
   the first resistance element is not exposed to the flow path of the air directed by the air blowing unit, and
   the detection unit detects a sign of corrosion caused by the surrounding atmosphere based on a change in the intermediate voltage.

* * * * *